United States Patent
Kharul et al.

(10) Patent No.: US 9,713,796 B2
(45) Date of Patent: Jul. 25, 2017

(54) PROCESS FOR THE PREPARATION OF MOFS-POROUS POLYMERIC MEMBRANE COMPOSITES

(71) Applicant: Council of Scientific & Industrial Research, New Delhi (IN)

(72) Inventors: Ulhas Kanhaiyalal Kharul, Pune (IN); Rahul Banerjee, Pune (IN); Divya Nagaraju, Pune (IN)

(73) Assignee: Council of Scientific & Industrial Research (IN)

( * ) Notice: Subject to any disclaimer, the term of this patent is extended or adjusted under 35 U.S.C. 154(b) by 91 days.

(21) Appl. No.: 14/764,071

(22) PCT Filed: Jan. 28, 2014

(86) PCT No.: PCT/IN2014/000068
§ 371 (c)(1),
(2) Date: Jul. 28, 2015

(87) PCT Pub. No.: WO2014/115177
PCT Pub. Date: Jul. 31, 2014

(65) Prior Publication Data
US 2015/0367294 A1    Dec. 24, 2015

(30) Foreign Application Priority Data

Jan. 28, 2013 (IN) .......................... 0204/DEL/2013

(51) Int. Cl.
*B01D 53/22* (2006.01)
*B01D 71/64* (2006.01)
(Continued)

(52) U.S. Cl.
CPC ........... *B01D 71/64* (2013.01); *B01D 53/228* (2013.01); *B01D 67/0079* (2013.01);
(Continued)

(58) Field of Classification Search
CPC .. B01D 71/64; B01D 53/228; B01D 67/0079; B01D 69/10; B01D 69/125; B01D 71/00;
(Continued)

(56) References Cited

U.S. PATENT DOCUMENTS 7,637,983 B1 * 12/2009 Liu ...................... B01D 53/228
210/500.21
8,673,057 B2 * 3/2014 Zhou ................... B01D 53/228
423/702
(Continued)

FOREIGN PATENT DOCUMENTS

WO    2012011212 A1    1/2012

OTHER PUBLICATIONS

Divya Nagaraju, Deepti G. Bhagat, Rahul Banerjee, Ulhas K. Kharul: "In situ growth of metal-organic frameworks on a porous ultrafiltration membrane for gas separation" J. Mater. Chem. A, vol. 1, May 16, 2013 (May 16, 2013), pp. 8828-8835, XP002726901, DOI: 10.1039/C3TA10438A the whole document.
(Continued)

*Primary Examiner* — Anthony Shumate
(74) *Attorney, Agent, or Firm* — Lerner, David, Littenberg, Krumholz & Mentlik, LLP (57) ABSTRACT

Disclosed herein is an in-situ process for the preparation of Metallic Organic Framework's (MOF's)—polymer composites at room temperature, without requirement of pre-seeding o MOF's or substrate modification. Further, the invention provides MOF-polymer composites membranes, wherein MOF forms a layer substantially covering the porosity of the membrane.

14 Claims, 7 Drawing Sheets

(51) Int. Cl.
*B01D 67/00* (2006.01)
*B01D 69/12* (2006.01)
*B01D 71/00* (2006.01)
*B01D 69/10* (2006.01)
*C08J 9/36* (2006.01)
*B01D 71/42* (2006.01)
*B01D 71/68* (2006.01)

(52) U.S. Cl.
CPC ........... *B01D 69/10* (2013.01); *B01D 69/125* (2013.01); *B01D 71/00* (2013.01); *C08J 9/36* (2013.01); *B01D 71/42* (2013.01); *B01D 71/68* (2013.01); *B01D 2323/40* (2013.01); *C08J 2333/20* (2013.01); *C08J 2381/06* (2013.01)

(58) Field of Classification Search
CPC .... B01D 71/42; B01D 71/68; B01D 2323/40; C08J 9/36; C08J 2333/20; C08J 2381/06
See application file for complete search history.

(56) References Cited

U.S. PATENT DOCUMENTS

| | | | | |
|---|---|---|---|---|
| 9,192,913 | B2* | 11/2015 | Inubushi | B01D 53/02 |
| 2007/0202038 | A1* | 8/2007 | Yaghi | B01J 20/226 423/702 |
| 2009/0131242 | A1* | 5/2009 | Liu | B01D 53/228 502/4 |
| 2009/0131643 | A1* | 5/2009 | Ni | C01G 9/00 534/16 |
| 2009/0169857 | A1* | 7/2009 | Fischer | B01J 20/226 428/304.4 |
| 2010/0075123 | A1* | 3/2010 | Masel | C07C 51/412 428/219 |
| 2010/0132547 | A1* | 6/2010 | Masel | B01D 15/00 95/90 |
| 2011/0138999 | A1* | 6/2011 | Willis | B01D 53/228 95/45 |
| 2011/0172412 | A1* | 7/2011 | Serre | C07C 7/13 540/145 |
| 2012/0247328 | A1* | 10/2012 | Brown | B01D 53/228 95/51 |
| 2012/0297982 | A1* | 11/2012 | Dinca | B01D 53/228 96/4 |
| 2013/0204025 | A1* | 8/2013 | Buso | C07F 3/003 556/130 |
| 2013/0330658 | A1* | 12/2013 | Palmqvist | B01J 31/1625 429/532 |
| 2014/0330020 | A1* | 11/2014 | Banerjee | C07F 3/06 546/12 |
| 2015/0273401 | A1* | 10/2015 | Miller | B01D 67/0037 210/500.25 |

OTHER PUBLICATIONS

Mikhail Meili Khov et al: "Stepwise deposition of metal organic frameworks on flexible synthetic polymer surfaces", Dalton Transactions, vol. 40, No. 18, Jan. 1, 2011 (Jan. 1, 2011), pp. 4838-4841, XP055127857, ISSN: 1477-9226, DOI: 10.1039/c0dt01820a the whole document.

Teng Ben et al: "Polymer-Supported and Free-Standing Metal-Organic Framework Membrane", Chemistry—A European Journal, vol. 18, No. 33, Aug. 13, 2012 (Aug. 13, 2012), pp. 10250-10253, XP055127869, ISSN: 0947-6539, DOI: 10.1002/chem.201201574 the whole document.

Andrea Centrone et al: "Growth of Metal-Organic Frameworks on Polymer Surfaces", Journal of the American Chemical Society, vol. 132, No. 44, Nov. 10, 2010 (Nov. 10, 2010), pp. 15687-15691, XP055127859, ISSN: 0002-7863, DOI: 10.1021/ja106381x the whole document.

Rizhe Jin et al: "ZIF-8 crystal coatings on a polyimide substrate and their catalytic behaviours for the Knoevenagel reaction", Dalton Transactions, vol. 42, No. 11, Jan. 1, 2013 (Jan. 1, 2013), pp. 3936-3940, XP055127870, ISSN: 1477-9226, DOI: 10.1039/c2dt32161k the whole document.

Darren Bradshaw et al: "Metal-organic framework growth at functional interfaces: thin films and composites for diverse applications", Chemical Society Reviews, vol. 41 , No. 6, Jan. 1, 2012 (Jan. 1, 2012), pp. 2344-2381, XP055127875, ISSN: 0306-0012, DOI: 10.1039/c1cs15276a p. 2362, left-hand column, paragraph 3—p. 2364, left-hand column, paragraph 4.

Miral Shah et al: "Current Status of Metal-Organic Framework Membranes for Gas Separations: Promises and Challenges", Industrial & Engineering Chemistry Research, vol. 51, No. 5, Feb. 8, 2812 (2812-82-88), pp. 2179-2199, XP855127880, ISSN: 0888-5885, DOI: 10.1021/ie202038m section 5.6.

Angelique Betard et al: "Metal-Organic Framework Thin Films: From Fundamentals to Applications.", Chemical Reviews, vol. 112, No. 2, Feb. 8, 2012 (2012-82-88), pp. 1055-1083, XP055127887, ISSN: 0009-2665, DOI: 10.1021/cr200167v sections 2-2.2.1 section 4.3.1.

Norbert Stock et al: "Synthesis of Metal-Organic Frameworks (MOFs): Routes to Various MOF Topologies, Morphologies, and Composites", Chemical Reviews, vol. 112, No. 2, Feb. 8, 2012 (Feb. 8, 2012), pp. 933-969, XP055033817, ISSN: 0009-2665, DOI: 10.1021/cr200304e section 6.2.

International Search Report for Application No. PCT/IN2014/000068 dated Jul. 30, 2014, 4pgs.

Harold B. Tanh Jeazet et al., Metal-organic frameworks in mixed-matrix membranes for gas separation; Dalton Trans., 2012, 41, 14003-14027.

Liu et al., Deposition of Metal-Organic Frameworks by Liquid-Phase Epitaxy: The Influence of Substrate Functional Group Density on Film Orientation; Materials 5 (9), 1581-1592.

Lei Ge et al., Porous Polyethersulfone-Supported Zeolitic Imidazolate Framework Membranes for Hydrogen Separation; The Journal of Phys. Chem. C 2012, 116 13264-70.

* cited by examiner

Figure 6 a) CuBTC@PSF composite b) ZIF-8@PSF composite

PROCESS FOR THE PREPARATION OF MOFS-POROUS POLYMERIC MEMBRANE COMPOSITES

CROSS-REFERENCE TO RELATED APPLICATIONS

The present application is a national phase entry under 35 U.S.C. §371 of International Application No. PCT/IN2014/000068 filed Jan. 28, 2014, published in English on Jul. 31, 2014, which claims priority from Indian Patent Application No. 0204/DEL/2013 filed Jan. 28, 2013, all of which are incorporated herein by reference.

TECHNICAL FIELD OF THE INVENTION

Present invention provides a process for the in situ growth of Metallic Organic Framework's (MOF's) at room temperature (20-40° C.) on porous polymeric substrate/membrane to obtain continuous MOF's-polymer composite without requirement of pre-seeding of MOF's or substrate modification.

Further, the invention provides MOF-polymer composites membranes, wherein MOF forms a layer covering the porosity of the membrane.

BACKGROUND AND PRIOR ART OF THE INVENTION

The crystallization of Metal Organic Frameworks (MOFs) on the surface of organic and inorganic membrane materials has picked up recent scientific attention. It has been shown that MOF membranes and thin films synthesized in this way have potential application in separation of industrial gases and liquids, amongst several more potential applications, including solar cells, fuel cells, drug delivery, healthcare, optoelectronics and so on and so forth. MOF based membranes have been synthesized using inorganic porous supports like alumina, zeolites, silica, graphite, carbon, etc. Though these inorganic materials possess high thermal stability, their usage is limited because of their brittleness and lack of flexibility, hindering their fabrication into continuous sheets for practical applications. In order to overcome these limitations, recently researchers have attempted usage of flexible organic polymeric membranes like polymethylmethaacrylate (PMMA), polyimides, matrimids, polysulfone and similar materials to fabricate MOF polymer composites. These flexible polymeric membranes can effectively be fabricated into flexible sheets, commercially beneficial patterns, and are amenable to easy large scale production and possess high pressure stability.

Harold B et al, cited in *Dalton Trans.*, 2012, 41, 14003 report Mixed Matrix Membranes (MMM's) with metal-organic frameworks such as CuBTC, Zeolites as additives exhibiting gas permeability and selectivity. Polyimides and polysulfone were the general polymer matrices for MOF fillers used herein. The researchers have suggested that pore blockage around the interface region of the MOF may possibly lower the permeability; however the study is silent on a method for fabrication of MOF-polymer composites.

Common methods used to synthesize MOF-polymer composites include blending the pre-synthesized MOFs with the polymer matrix via secondary seeded growth processes or by functionalizing the substrate using —COOH or pyrimidine surface terminated substrates.

Liu et al in *Materials* 2012, 5, 1581-1592 describe deposition of metal-organic frameworks (MOF) by liquid-phase epitaxy (LPE) on —COOH terminated templating organic surfaces prepared by the adsorption of self-assembled monolayers (SAM's) on gold substrates to form MOF thin films. The influence of the packing density of the carboxylic acid group on the orientation and quality of MOF thin films grown using the LPE is determined.

The epitaxial growth process consists of alternately immersing an appropriate SAM substrate into ethanolic solutions of copper acetate and $H_3BTC$ (benzene-1,3,5-tricarboxylic acid). The solutions were kept at 50° C. during MOF thin film preparations.

Lui et al teaches the process of alternately immersing SAM into a ligand and the metal solution; however the number of cycles for subjecting SAM's is also, not specified for immersing the same.

Lei Ge et al in *The Journal of Phys. Chem.* 2012, 116 13264-70, describes a hydrothermal route for synthesis of ZIF-8 thin layer on the asymmetric porous polyethersulfone (PES) substrate via secondary seeded growth. In such processes the thickness and microstructure of the polymeric membranes should be optimized by the synthesis conditions to improve gas separation performance.

Further, fabrication of free-standing MOF membranes using nanofibrous mats produced by electrospinning as a new type of porous support is reported by Qui et al in *Chem. Eur. J.* 2012, 18, 10250-53, a two-step procedure was developed, namely the preparation of MOF nanocrystal doped electrospun fibers followed by a second growth.

MOF-polymer composites achieved by blending pre-synthesized MOF's with polymer membranes often results in sedimentation and agglomeration of crystals. High loading of MOF crystals in the polymer matrix results into brittleness. Moreover, by blending, opening of nanocrystals may be covered by polymer chains, thus hindering direct contact of the penetrant with nanocrystals. However, in the instant invention MOF's are formulated, and then applied on porous polymer to form the MOF-polymer composite.

PCT Application: WO/2012/11212 is directed to a mixed-matrix composite (mixed-matrix membranes (MMMs) comprising a continuous phase and zeolitic imidazolate framework (ZIF) particles dispersed in the continuous phase, wherein the continuous phase is polybenzimidazole (PBI)).

The invention claims a process of forming a mixed-matrix composite material, comprising mixing ZIF particles into PBI solution for a sufficient amount of time to allow ZIF particles to uniformly disperse in the PBI solution; and fabricating the solution to thereby produce mixed-matrix composite material comprising of PBI and ZIF particles dispersed in the continuous phase.

The drawback of this process is that the ZIF particles may be randomly positioned on the polymer membrane composite thus affecting the gas separation efficiency of the composite system.

OBJECTS OF THE INVENTION

Main object of the present invention is to provide a simple room temperature process without the requirement for pre-seeding or substrate modification for the in-situ growth of a MOF's on porous polymeric membrane to form a MOF-polymer composite wherein MOF is grown within the pores as well as on the top of polymeric membrane forming a MOF layer on it covering the porosity of the membrane.

Another object of the present invention is to provide a composite that provides improved separation efficiencies for gases, hydrocarbons, solutes from solutions and such like.

SUMMARY OF THE INVENTION

Accordingly present invention provides an in-situ process for preparation of MOF-polymer composite substantially devoid of pores without pre-seeding or substrate modification, comprising the steps of:
a) subjecting a porous polymer membrane to solvent treatment for period in the range of 4 to 8 hr;
b) repeatedly treating the membrane of step (a) with ligand solution A for period in the range of 8 to 12 hrs followed by treatment with metal solution B for period in the range of 8 to 12 hrs or vice versa; and
c) repeatedly treating the membrane of step (b) with ligand solution (A) for period in the range of 8 to 12 hrs, followed by suspending the membrane in mixture of solution A and B for period in the range of 8 to 12 hrs to obtain MOF polymer composite.

In an embodiment of the present invention, the solvent used in step (a) is selected from the group consisting of methanol, dimethyl form amide (DMF), ethyl alcohol (EtOH), butanol, isopropyl alcohol, n-propanol, acetonitrile, acetone, ethyl acetate or mixtures thereof.

In another embodiment of the present invention, the solvent is methanol and mixture of DMF:EtOH:water (1:1:1 v/v).

In yet another embodiment of the present invention, step (b) is repeated atleast for two cycles and step (c) is repeated atleast for three cycles.

In yet another embodiment of the present invention, the ligand (A) is selected from the group consisting of benzene tricarboxylic acid (BTC) and 2-methyl imidazole (MIM) and the solutions are made using the solvents as given in claim 3.

In yet another embodiment of the present invention, the metal solution (B) is selected from the group consisting of $Cu(NO3)2$, copper acetate, $CuSO_4$, $Zn(NO3)2$, Zinc acetate or $ZnSO_4$.

In yet another embodiment of the present invention, TEA is used as catalyst for the metal solution (B) of Copper.

In yet another embodiment of the present invention, the process is carried out at temperature ranging from 20 to 40° C.

In yet another embodiment of the present invention, the support used in step (a) is selected from polysulfone (PSF) and polyacrylonitrile (PAN).

In yet another embodiment of the present invention, the MOF-polymer composites is selected from CuBTC-PSF; ZIF-8-PSF (Zinc Imidazolate framework); CuBTC-PAN and ZIF-8-PAN.

In yet another embodiment of the present invention, the thickness of the MOF layer on the polymeric membrane ranges from 10 µm-25 µm.

In yet another embodiment of the present invention, CuBTC crystals have size ranging from 5 to 20 µm on the polysulfone membrane surface and 200 to 500 nm inside the pores.

In yet another embodiment of the present invention, the ZIF-8 crystals have size ranging from 5 µm to 200 nm on the polysulfone membrane surface and 20-80 nm inside the pores.

In yet another embodiment, present invention provides Metallic Organic Framework's (MOF)-polymer composite as prepared by the process given above having thickness of the MOF layer on the polymeric membrane ranges from 10 µm-25 µm.

ABBREVIATIONS

MOFs: Metal organic frameworks
ZIF: Zeolytic Imidazole Frameworks
PSF: Polysulfone
PAN: Polyacrylonitrile
BTC: Benzene tricarboxylic acid
2-MIM: 2-methyl imidazole
DMF: N,N-Dimethyl formamide
EtOH: Ethyl alcohol
TEA: Tri-ethyl amine
PXRD: Powder X-ray diffraction
SEM: Scanning electron microscopy

DETAILED DESCRIPTION OF THE INVENTION

Present invention provides a process for the in-situ growth of Metallic Organic Framework's (MOF's) on porous polymeric substrate/membrane to obtain continuous and denser MOF's-polymer composite.

The invention provides a MOF-polymer composite comprising a porous polymeric membrane and an MOF, wherein the MOF forming a layer on the polymeric membrane.

Further, the instant invention provides MOF-polymer composite membranes synthesized by the instant process; the MOF-polymer composites include Polysulfone supported MOF's and Polyacrylonitrile supported MOF's.

Polysulfone supported MOF's are CuBTC-PSF (Polysulfone) and ZIF-8-PSF (Zinc Imidazolate Framework), and Polyacrylonitrile supported MOF's are CuBTC-PAN (Polyacrylonitrile) and ZIF8-PAN.

The invention provides an in-situ process for the preparation of a MOF-polymer composite substantially devoid of pores, without pre-seeding or substrate modification, comprising the following cycles:
a) subjecting a porous polymer membrane to solvent treatment;
b) repeatedly treating the membrane of step (a) with ligand solution A followed by treatment with metal solution B or vice-versa; and
c) repeatedly treating the membrane of step (b) with ligand solution (A), followed by suspending the membrane in mixture of solution A and B to acquire further loading of MOF on polymer.

According to the process, the porous polymer membranes separated by a mesh spacer are subjected to treatment in a solvent mixture for 4-8 h.

The solvent is selected from the group consisting of methanol, water, dimethyl formamide (DMF), ethyl alcohol (EtOH), butanol, isopropyl alcohol, n-propanol, acetonitrile, acetone, ethyl acetate or mixtures thereof. The solvent mixture of DMF:EtOH:H$_2$O is in the volume ratio of 1:1:1 is preferably used in the process.

Further, the solvent treated membrane is either immersed in the ligand solution (A) followed by treatment with metal solution B or vice-versa for 8-12 h. This step is repeated for atleast two cycles.

The loaded membranes are first immersed in a solution containing the ligand (A) and TEA and then suspended into a solution containing both the metal (B) and ligand (A) solution for 8-12 h. This step is repeated for atleast three cycles, to attain further loading of the MOF on the polymer substrate.

Consequently, step b involves atleast three cycles and step c at least includes the next four cycles.

The polymeric membranes used in the instant process are polysulfone (PSF) and polyacrylonitrile (PAN) which allow tuning of membrane layer thickness, porosity and the composition of polymer in a desirable way to produce porous membranes are used for in-situ crystallization of the MOF's.

The ligands are selected from the group consisting of benzene tricarboxylic acid (BTC) and 2-methylimidazole (MIM) and the metal solution is selected from the group consisting of salts of copper—Cu(NO$_3$)$_2$, copper acetate and salts of Zinc—Zn(NO$_3$)$_2$, Zinc acetate, ZnSO$_4$.

The invention provides that the instant process results in formation of MOF-polymer composites wherein, the MOF's form a layer on the polymeric membrane substantially covering the porosity of the membrane.

Accordingly, the MOF's forming a layer covering the porosity of the polymeric membrane by the instant process is characterized by PXRD and SEM techniques.

PXRD analysis indicates that as the number of cycles according to, the instant process increases the peak intensity increases as well, thus indicating an increased MOF crystal coverage on the polymer membrane.

Figure 3:
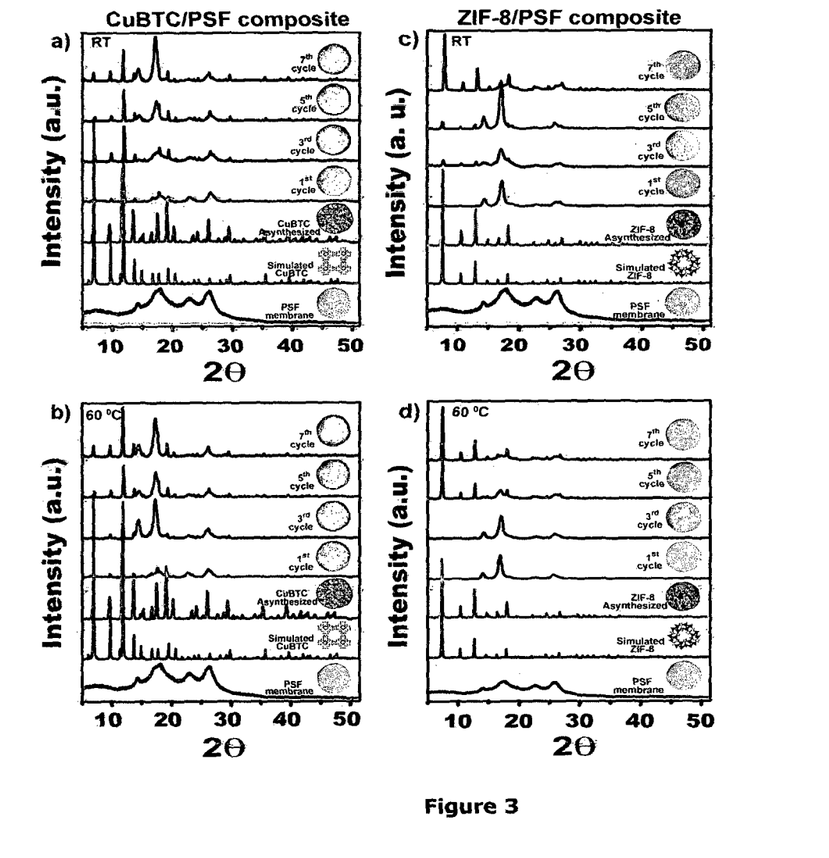
FIG. 3 depicts PXRD patterns of CuBTC@PSF and ZIF-8@PSF composite membranes. a), b) are the PXRD pattern for CuBTC@PSF composite membranes at RT and 60° C. respectively at every alternative cycle c) and d) are the PXRD pattern for ZIF-8@PSF composite membranes at RT and 60° C. respectively at every alternative cycle.
Figure 4:
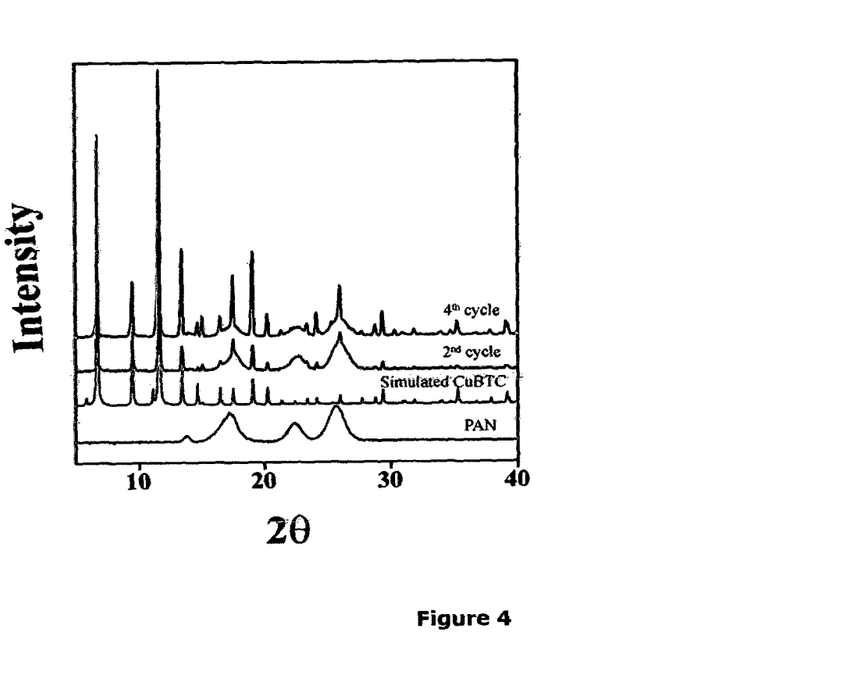
FIG. 4 depicts PXRD patterns of Cu-BTC-PAN composite membranes

In PXRD data provided in FIG. 3, in the first few cycles of the process pristine polymer membrane peaks dominated, but in the latter cycles, the MOF peaks intensify. This indicates an increase in crystal coverage, and also confirms that treatment of composite membranes at the 4$^{th}$ cycle with both metal and ligand solution helped in increasing crystal coverage. At the 7$^{th}$ cycle MOF levels increase thus confirming that at the 7$^{th}$ cycle MOF crystals have almost covered the membrane surface to the full extent.

SEM analysis (FIG. 5) shows the surface crystal growth of MOF-polymer composite membranes respectively wherein the crystal layers were actually stacked on one another and thus helps in covering the gaps, which almost look like continuous sheet. This confirms that the pores of the membrane are also filled with the crystals because of the diffusion of metal ions and ligand ions into the membrane. The chance of diffusion of the metal and ligand ions into the membrane pore decreases as the crystal layers increase on surface and as a result the crystal growth within the pores is comparatively less.

The invention provides MOF-polymer composites derived by the instant process, wherein the MOF-polymer composites are PSF supported MOF's and PAN supported MOF's.

PSF supported MOF's are CuBTC-PSF (Polysulfone) and ZIF-8-PSF (Zinc Imidazolate framework) and, PAN supported MOF's are CuBTC-PAN (Polyacrylonitrile) and ZIF-8-PAN.

The invention provides an in-situ process for the preparation of CuBTC-PSF (polysulfone) composites substantially devoid of pores without pre-seeding or substrate modification, comprising the following cycles:
a) subjecting a PSF porous polymer membrane to solvent treatment;
b) repeatedly treating the membrane of step (a) with ligand solution BTC (Benzene tri carboxylic acid) followed by treatment with a copper salt solution or viceversa; and
c) treating the membrane of step (b) with BTC, followed by suspending the membrane in mixture of solution BTC and a copper salt to acquire further loading of CuBTC on PSF.

Further, the crystal sizes of CuBTC formed on the surface of the polysulfone membrane ranges from 5 to 20 µm and the crystal sizes of ZIF-8 is 20 to 80 nm within the pores.

In another typical embodiment, the invention provides an in-situ process for the preparation of ZIF8-PSF (polysulfone) composites substantially devoid of pores without pre-seeding or substrate modification, comprising the following cycles:
a) subjecting a PSF porous polymer membrane to solvent treatment;
b) repeatedly treating the membrane of step (a) with ligand solution MIM (2-Methyl imidazolate) followed by treatment with a zinc salt solution or viceversa; and c) treating the membrane of step (b) with MIM, followed by suspending the membrane in mixture of solution MIM and a zinc salt to acquire further loading of ZIF-8 on PSF.

Figure 7:
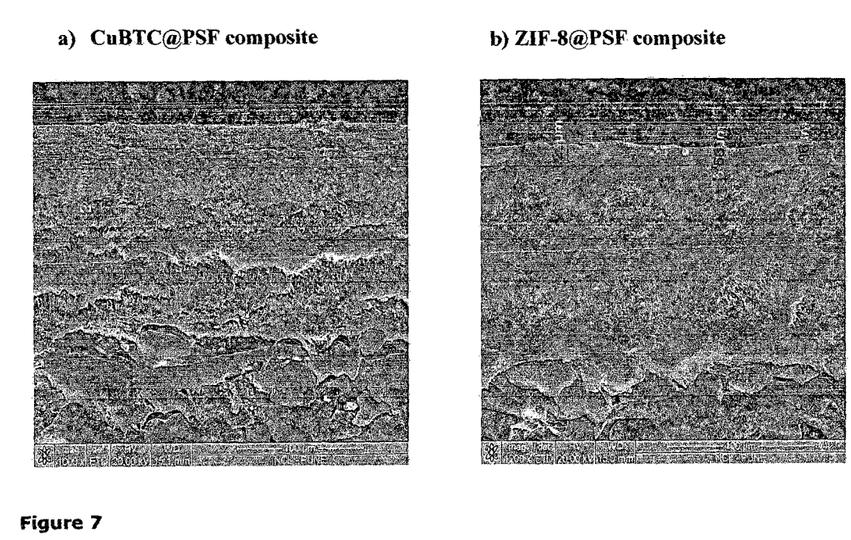
FIG. 7 depicts the SEM images showing the thickness of a) CuBTC@PSF and b) ZIF-8@PSF composites.

Further, the thickness of the layers of CuBTC and ZIF-8 on the PSF membrane is approximately 25 μm and 10 μm respectively according to SEM analysis. (FIG. 7).

In yet another typical embodiment, the in-situ room temperature process comprises: dipping hydrolysed, casted PAN membrane in solution of a salt of copper followed by dipping the membrane in a solution of benzene tricarboxylic acid to obtain the composite of CuBTC-PAN.

In yet another embodiment, the in-situ process for the preparation of a MOF-polymer composite substantially devoid of pores, is performed at temperatures ranging from 20°-40° C.

While the composition of the invention finds use in several applications, including but not limited to solar cells, fuel cells, drug delivery, healthcare and optoelectronics, the inventors have studied the gas permeation characteristics of the composition and the same is exemplified herein.

Experimental: MOF-Polymer Composite Characterization:

FTIR Analysis

The FTIR spectra of the pristine PSF, as synthesized CuBTC, ZIF-8, CuBTC@PSF composite, and ZIF-8@PSF composite membranes were collected to identify the loading of CuBTC and ZIF-8 crystals on the PSF membrane. Pristine PSF was characterized by the bands at 1584, 1492 $cm^{-1}$ (aromatic C=C stretching), 1243 $cm^{-1}$ (asymmetric C—O—C stretching of aryl ether group), 1151 $cm^{-1}$ (asymmetric O=S=O stretching of sulfonate group), 1105 $cm^{-1}$ (symmetric O=S=O stretching of sulfone group).

For the CuBTC@PSF composite membrane after the 7th cycle, all the major bands of CuBTC such as 1647 (C=O symmetric), 1444 (C=C—Ar) and 1369 $cm^{-1}$ (C—O) started dominating over the low intensity weak bands of PSF around 1243 $cm^{-1}$ (asymmetric C—O—C stretching of aryl ether group) and 1105 $cm^{-1}$ (asymmetric O=S=O stretching of sulfonate group); which confirms the presence of CuBTC. ZIF-8@PSF composite membranes after the 7th cycle show the presence of weak bands at 3105, 2966 $cm^{-1}$ (C—H bonds in the methyl group and the imidazole ring) medium bands at 994 $cm^{-1}$ (C—H bonds in the imidazole ring) and at 1179 $cm^{-1}$ (C—N bonds in imidazole moiety) with PSF strong bands at 1243 $cm^{-1}$ (asymmetric C—O—C stretching of aryl ether groups), 1105 $cm^{-1}$ (symmetric O=S=O stretching of sulfone group) and weak bands at 1584, 1492 $cm^{-1}$ (aromatic C=C stretching) which confirms the presence of ZIF-8 on the PSF membrane.

PXRD Analysis

The formation of CuBTC@PSF and ZIF-8@PSF was verified by PXRD. PXRD patterns of the as-synthesized CuBTC and ZIF-8 match well with the simulated patterns obtained from the single crystal data. PXRD of the pristine PSF, membrane showed three major peaks in the 2θ range of 15° to 30°, which are amorphous in nature.

The CuBTC@PSF composite and ZIF-8@PSF composite membranes were analyzed at every alternative cycle. Correspondingly, they are also supported by the images taken on a digital camera, as shown in FIG. 3 for their respective PXRD patterns. As the number of cycles increased, the peak intensity increased as well. This provided a clear indication of increased MOF crystal growth on the PSF membrane. During the 1st and the 3rd cycle, pristine PSF membrane PXRD peaks dominated, but in the 5th cycle the CuBTC and ZIF-8 peaks started intensifying. This confirms that dipping of the composite membranes at the 4th cycle into both the metal and ligand solution helped in increasing crystal coverage. At the 7th cycle the CuBTC peaks in FIGS. 3a and b and ZIF-8 peaks in FIGS. 3c and d appear to be very high. This confirms that at the 7th cycle, MOF crystals have almost covered the membrane surface to a full extent.

Moreover, this analysis also conveys that the multiple cycles did not affect the crystal structure of the MOF.

SEM Analysis

Figure 5:
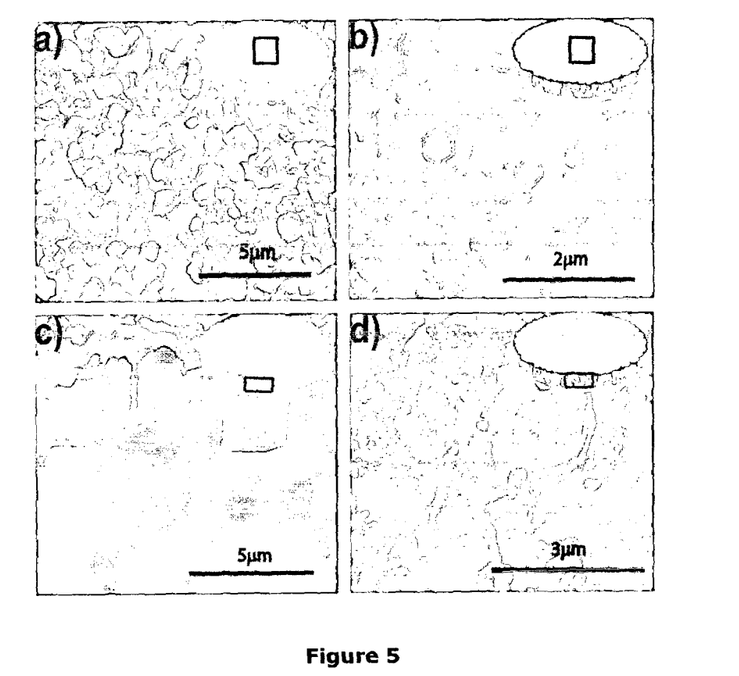
FIG. 5 depicts SEM images of the CuBTC@PSF and ZIF-8@PSF composite membranes (a) top view of CuBTC@PSF composite membrane, (b) top view of ZIF-8@PSF composite membrane, (c) cross section of CuBTC@PSF composite membrane and (d) cross section of ZIF-8@PSF composite membrane.
Figure 6:
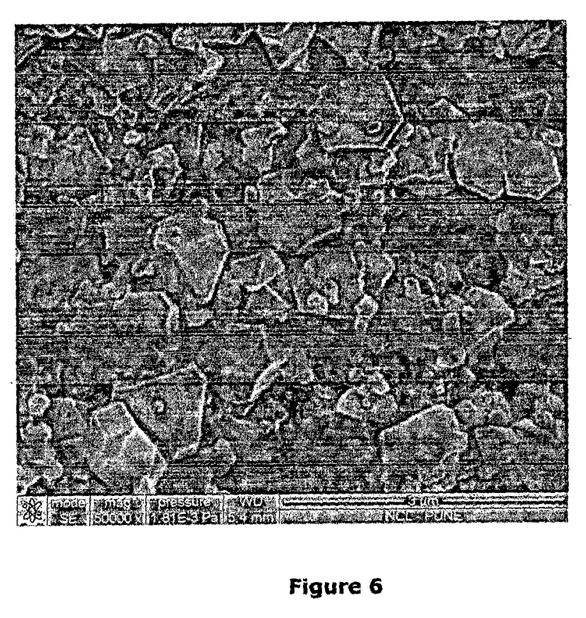
FIG. 6 depicts SEM images of Cu-BTC-PAN composite membranes

The growth of CuBTC and ZIF-8 crystals on the CuBTC@PSF and ZIF-8@PSF composite membranes respectively were further confirmed by SEM imaging. FIGS. 5a and b show the surface crystal growth of CuBTC@PSF and ZIF-8@PSF composite membranes respectively. The crystal layers were actually stacked on one another which aids in covering the gaps, and almost looked like a continuous sheet (FIG. 5b). FIGS. 5c and d show the cross section of the CuBTC@PSF and ZIF-8@PSF composite membranes. This confirms that pores of the membrane were also filled with the crystals because of the diffusion of metal ions and ligand ions into the membrane pores. But the inner pore voids were not as densely populated as the pore opening. As the crystal layers increase on surface, the chance of diffusion of the metal and ligand ions deeper inside the pore decreases and as a result, the crystals grow predominantly at the pore opening, rather than within the pores. This comparatively smaller growth, deeper inside the pores is seen in FIGS. 5c and d. The crystal sizes for CuBTC and ZIF-8 were 200-250 nm and 250-300 nm respectively on the surfaces and 2-3 mm and 60-70 nm respectively within the pores. As the CuBTC and ZIF-8 synthesized are nano-crystalline, their sizes may vary drastically on the physical parameters like duration of the crystals in the mother liquor, space availability and the environment within the membrane. The thickness of the layers of CuBTC and ZIF-8 on the PSF membrane was approximately 25 μm and 10 μm respectively (FIG. 7). This thickness also varies depending on the extent of the growth of crystals on the surface of the PSF membrane.

EXAMPLES

Following examples are given by way of illustration therefore should not be construed to limit the scope of the invention.

Figure 1:
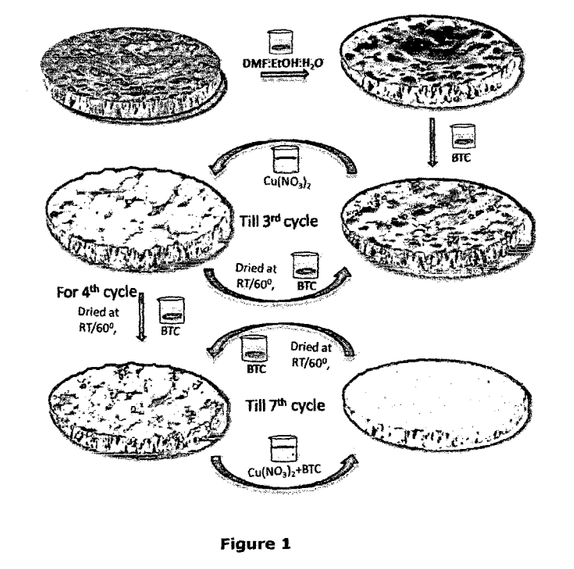
FIG. 1 depicts the scheme of synthesis for CuBTC@PSF composite membranes by in-situ crystallization and layer by layer deposition of crystals. Till $3^{rd}$ cycle the crystallization is followed by in-situ method which leads to nucleation on the membrane as well as pore surface and from $4^{th}$ cycle layer by layer deposition of crystals helps in forming the denser crystal layers which cover the entire surface of the membrane.
Figure 2:
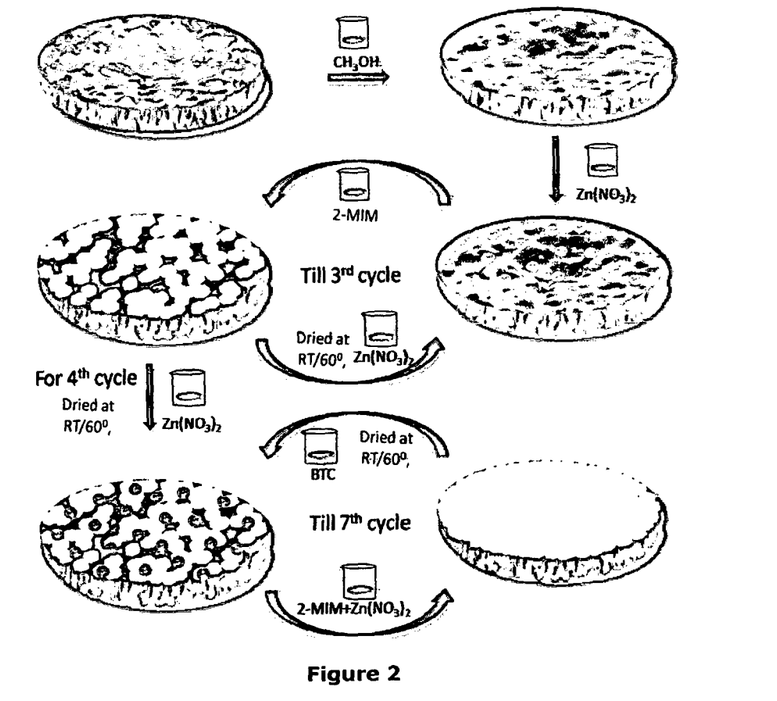
FIG. 2 depicts the scheme of synthesis of ZIF-8@PSF composite membranes by the in-situ crystallization and layer by layer deposition of crystals. Till the $3^{rd}$ cycle crystallization is followed by in-situ method which leads to heterogeneous nucleation and from $4^{th}$ cycle layer by layer deposition of crystals helps in forming the denser crystal layers which cover the gaps developed initially due to the heterogeneous nucleation.

The method of preparations of the MOF-polymer composite membranes are depicted in pictorial form in FIGS. 1 and 2.

Example 1

Casting of PAN-17 Membranes

Flat sheet PAN-based ultrafiltration membrane was prepared by phase inversion method. A doped solution containing 136 g of dried PAN powder and 26.56 of $ZnCl_2$ in 637.44 g of N-methyl pyrrolidone (NMP) was prepared by stirring for 48 h at dry conditions. The formed doped solution was degassed and then centrifuged at ~2700 rpm for 3 h. The membrane was casted on moving non-woven support fabric using pilot scale continuous membrane casting facility at 17° C. gelation temperature and 41° C. curing temperature. The formed membrane had an average thickness of ~250 μm and was stored with aqueous formalin solution (0.5%) at 4° C. until further use. The gas permeation study was done on these membranes and the results are as follows:

TABLE 1

Gas permeation study of PAN-17

| | Permeation | | | | Selectivity | | |
|---|---|---|---|---|---|---|---|
| | $C_3H_6$ | $CO_2$ | $CH_4$ | $H_2$ | $H_2/C_3H_6$ | $CO_2/C_3H_6$ | $CH_4/C_3H_6$ |
| PAN-17 | 787 | 769 | 1225 | 2995 | 4 | 1 | 2 |

Example 2

Hydrolysis of PAN-17 for 2 Hrs

Membrane sample was mounted in a cross-flow cell and 1N NaOH solution was circulated with trans-membrane pressure of 100 kPa for 2 h at 40° C. The NaOH treatment was followed by post-HCl treatment by circulating 0.5 N HCl solution at 1 bar, till 150 mL of permeate (HCl solution) was collected. Such hydrolyzed membranes were cut into circular coupons and dried at RT and further used for gas permeation study.

Example 3

Synthesis of CuBTC@Hy-PAN (2 Hrs) Composite Membranes

Hydrolysed PAN membrane was washed with water to remove formalin and cut into circular coupons/sections of 5 cm in diameter. During the first cycle, about ten membranes separated by a polypropylene mesh spacer were first dipped in 250 ml beaker containing 200 ml mixture of DMF:EtOH:$H_2O$ (1:1:1 volume ratio) for 6 hrs and then into a 250 ml beaker containing BTC (10 g, 2.38 mmol) and TEA (triethyl amine) (10.0 ml) in 240 ml of 1:1:1 volume ratio of above solvent mixture for 12 hrs. The BTC loaded membranes were immersed into $Cu(NO_3)_2$ solution (16 g, 4.31 mmol) in 240 ml of 1:1:1 mixture of DMF:EtOH:$H_2O$ for 12 hrs and the membranes were washed with water followed by drying the membranes at room temperature conditions ranging from 20-40° C. The same procedure was followed till $4^{th}$ cycle. The gas permeation study was done on those membranes after $4^{th}$ cycle and the result is as given in Table 2.

TABLE 2

Gas permeation study of CuBTC@Hy-PAN composite membranes.

| | Permeation | | | | | Selectivity | | | |
|---|---|---|---|---|---|---|---|---|---|
| | $C_3H_6$ | $CO_2$ | $CH_4$ | $N_2$ | $H_2$ | $H_2/C_3H_6$ | $CO_2/C_3H_6$ | $CH_4/C_3H_6$ | $N_2/C_3H_6$ |
| CuBTC@Hy-PAN (2 hrs) | 69 | 1733 | 2224 | 934 | 6452 | 93.1 | 25.0 | 32.1 | 13.5 |

Example 4

Hydrolysis of PAN-17% for 6 Hrs

Membrane sample was mounted in a cross-flow cell and 1N NaOH solution was circulated with trans-membrane pressure of 100 kPa for 6 h at RT i.e. at 30° C. The NaOH treatment was followed by post-HCl treatment by circulating 0.5 N HCl solution at 1 bar, till 150 mL of permeate (HCl solution) was collected. Such hydrolyzed membranes were cut into circular coupons and dried at RT and further used for gas permeation study.

Example 5

Synthesis of CuBTC@Hy-PAN (6 Hrs) Composite Membranes

Hydrolysed PAN membrane was washed with water to remove formaline and cut into circular coupons of 5 cm in diameter. During the first cycle, about ten membranes separated by a polypropylene mesh spacer were first dipped in 250 ml beaker containing 200 ml mixture of DMF:EtOH:$H_2O$ (1:1:1 volume ratio) for 6 hrs and then into a 250 ml beaker containing BTC (10 g, 2.38 mmol) and TEA (10 ml) in 240 ml of 1:1:1 volume ratio of above solvent mixture for 12 hrs. The BTC loaded membranes were immersed into $Cu(NO_3)_2$ solution (16 g, 4.31 mmol) in 240 ml of 1:1:1 mixture of DMF:EtOH:$H_2O$ for 12 hrs and the membranes were washed with water followed by drying the membranes at varying temperature conditions (five membranes at RT and another five at 60° C. for 2 hrs). The same procedure was followed till $4^{th}$ cycle. The gas permeation study was done on these membranes at every cycle and at $3^{rd}$ cycle the gas permeation study showed significant reproducibility and the result is as given in Table 3.

TABLE 3

Gas permeation study of CuBTC@Hy-PAN (6 hrs) composite membranes.

| | | Permeation | | | | | Selectivity | | | |
|---|---|---|---|---|---|---|---|---|---|---|
| | | $C_3H_6$ | $CO_2$ | $CH_4$ | $N_2$ | $H_2$ | $H_2/C_3H_6$ | $CO_2/C_3H_6$ | $CH_4/C_3H_6$ | $N_2/C_3H_6$ |
| CuBTC@ Hy-PAN (6 hrs) | Coupon no. 1 | 41 | 1624 | 668 | 480 | 6041 | 146.6 | 39.4 | 16.2 | 11.7 |
| | Coupon no. 2 | 59 | 1176 | 651 | 468 | 4476 | 75.5 | 19.9 | 11.0 | 7.9 |
| | Coupon no. 3 | 63 | 774 | 360 | 155 | 2219 | 35.0 | 12.2 | 5.7 | 2.4 |

Example 6

Casting of PSF Membrane

Flat sheet polysulfone (PSF) based ultrafiltration membrane was prepared by phase inversion method. A dope solution containing 280 g of dried PSF in 1120 g of DMF was prepared while stirring for 24 hrs at dry conditions. The formed dope solution was degassed for 15 min. The membrane was casted on a moving nonwoven polyester support fabric (which is highly porous) using pilot scale continuous membrane casting facility at 14° C. gelation temperature and 60° C. curing temperature. The formed membrane had an average thickness of 250 μm and was stored with aq. formalin solution (0.5%) at 4° C. until further use. Circular Coupons of about 2.5 cm diameter were cut followed by drying at different temperature conditions like room temperature and 60° C. and then used for gas permeation studies as given in Table 4.

TABLE 4

Gas permeation of dried PSF membrane (without MOF growth)

| | Permeability | | | Selectivity | |
|---|---|---|---|---|---|
| | $C_3H_6$ | $H_2$ | $CO_2$ | $H_2/C_3H_6$ | $H_2/CO_2$ |
| PSF-60D | 2759 | 6089 | 2057 | 2 | 3 |
| PSF-RTD | 2626 | 6004 | 2027 | 2 | 3 |

Example 7

Synthesis of CuBTC@PSF composite membranes: PSF membrane was washed with water to remove formaline and cut into circular coupons of 5 cm in diameter. These samples were used as supports for in-situ crystallization of CuBTC at ambient conditions as shown in FIG. 1. During the first cycle, about ten membranes separated by a polypropylene mesh spacer were first dipped in 250 ml beaker containing 200 ml mixture of DMF:EtOH:$H_2$O (1:1:1 volume ratio) for 6 hrs and then into a 250 ml beaker containing BTC (10.0 g, 2.38 mmol) and TEA (10.0 ml) in 240 ml of 1:1:1 volume ratio of above solvent mixture for 12 hrs. The BTC loaded membranes were immersed into Cu($NO_3$)$_2$ solution (16.0 g, 4.31 mmol) in 240 ml of 1:1:1 mixture of DMF:EtOH:$H_2$O for 12 hrs and the membranes were washed with water followed by drying the membranes at varying temperature conditions (Five membranes at RT and another five at 60° C. for 2 hrs). The same procedure was followed for $2^{nd}$ and $3^{rd}$ cycle also. After the 3rd cycle, membranes were first immersed in BTC and TEA solution of aforementioned concentration and then suspended into the beaker containing both Cu($NO_3$)$_2$ and BTC+TEA solution for 12 hrs. This is followed by water wash and drying at RT or 60° C. for 2 hrs. This cycle was repeated for three more cycles, in order to acquire further loading of CuBTC inside the pores as well on the surface. These membranes were further used for gas permeation study and data obtained is as given in Table 6.

TABLE 6

Gas permeation data of CuBTC@PSF membranes.

| | Permeability | | | Selectivity | |
|---|---|---|---|---|---|
| | $C_3H_6$ | $H_2$ | $CO_2$ | $H_2/C_3H_6$ | $H_2/CO_2$ |
| CuBTC-60D | 96 | 503 | 131 | 5 | 4 |
| CUBTC-RTD | 41 | 236 | 33 | 6 | 7 |

Example 8

Synthesis of ZIF-8@PSF Composite Membrane

The washed PSF membrane was cut into circular coupons of 5 cm in diameter which are used as supports for in-situ crystallization of ZIF-8 at ambient conditions (at room temperature i.e. at 30° C.) as showed in FIG. 2. For the $1^{st}$ cycle, ten membranes separated by spacer were first dipped in methanol (200 ml) in a 250 ml beaker for 6 hrs and then the membranes were immersed into Zn($NO_3$)$_2$.6$H_2$O (2.9 g, 9.87 mmol) dissolved in 200 ml of above solvent for 12 hrs. Zn($NO_3$)$_2$ loaded membranes were immersed into 2-MIM solution (6.48 g, 79.04 mmol) in 200 ml of methanol for 12 hrs. This is followed by washing with water and drying the membranes at varying temperature conditions (five membranes at RT 25° C. and another five at 60° C. for 2 hrs). The same procedure was followed for $2^{nd}$ and $3^{rd}$ cycle. After $3^{rd}$ cycle the membranes were first immersed in 2-MIM solution and then into a beaker containing both Zn($NO_3$)$_2$ and 2-MIM solution for 12 hrs, washed with water and dried at RT at 30° C. for 2 hrs. The same cycle was repeated for three more times, and then used for gas permeation studies as given in Table 5.

TABLE 7

Gas permeation of ZIF-8@PSF membranes

| | Permeability | | | Selectivity | |
|---|---|---|---|---|---|
| | $C_3H_6$ | $H_2$ | $CO_2$ | $H_2/C_3H_6$ | $H_2/CO_2$ |
| ZIF8-60D | 479 | 1592 | 417 | 3 | 4 |
| ZIF8-RTD | 314 | 1190 | 317 | 4 | 4 |

Example 9

The membranes prepared in aforesaid examples were characterized by PXRD and SEM and the images obtained and their descriptions are provided. (Please refer FIGS. 3-6)

Example 10

Gas Permeation experiments: The gas permeation study of the membranes exemplified herein was studied in accordance with the protocol described herein. The CuBTC@PSF and ZIF-8@PSF composite membranes were tightly sealed into a gas permeation cell using silicone rubber O-rings. The effective membrane area was $2.5 \times 10^{-4}$ m$^2$. Pure gases viz., $H_2$, $N_2$, $CH_4$, $C_3H_6$ and $CO_2$ were used for permeation study at a upstream pressure of 40 psi on the feed side for each gas. The permeance (P) was calculated following Equation.1 and expressed in terms of GPU (Gas Permeation Unit) (1 GPU=$1\times10^{-6}$ cm·s$^{-1}$·cmHg$^{-1}$). The gas permeance can be expressed as, $$P = \frac{J}{A \times t \times \Delta p}$$

where J is the flux (amount of gas transported per unit area per unit time), A is the active area, t is the time taken by the gas to permeate through the membrane, Δp is the pressure gradient across the membrane.

ADVANTAGES OF THE INVENTION

1. Room temperature process.
2. Need of seeding or substrate functionalization is avoided
3. Hydrothermal conditions as proposed in prior arts is avoided
4. Improved gas permeation performance of membranes, also at lower pressures.
5. Useful for separation of hydrocarbons
6. Uniform, stable membranes obtained
7. Can be used in flat sheet/hollow fiber form of porous membranes

The invention claimed is:

1. An in-situ process for preparation of Metallic Organic Frameworks (MOF)-polymer composite substantially devoid of pores without pre-seeding or substrate modification, comprising the steps of:
   a) subjecting a porous polymer membrane to solvent treatment for period in the range of 4 to 8 hr;
   b) repeatedly treating the membrane of step (a) with ligand solution A for period in the range of 8 to 12 hrs followed by treatment with metal solution B for period in the range of 8 to 12 hrs or vice versa; and
   c) repeatedly treating the membrane of step (b) with ligand solution (A) for period in the range of 8 to 12 hrs, followed by suspending the membrane in mixture of solution A and B for period in the range of 8 to 12 hrs to obtain MOF polymer composite.

2. The process according to claim 1, wherein the solvent used in step (a) is selected from the group consisting of methanol, dimethyl form amide (DMF), ethyl alcohol (EtOH), butanol, isopropyl alcohol, n-propanol, acetonitrile, acetone, ethyl acetate or mixtures thereof.

3. The process according to claim 2, wherein the solvent is methanol and mixture of DMF:EtOH:water (1:1:1 volume ratio).

4. The process according to claim 1, wherein step (b) is repeated at least for two cycles and step (c) is repeated at least for three cycles.

5. The process according to claim 1, wherein the ligand (A) is selected from the group consisting of benzene tricarboxylic acid (BTC) and 2-methyl imidazole (MIM) and the solutions are made using as solvent, methanol and mixture of DMF:EtOH:water (1:1:1 volume ratio).

6. The process according to claim 1, wherein the metal solution (B) is selected from the group consisting of $Cu(NO_3)_2$, copper acetate, $CuSO_4$, $Zn(NO_3)_2$, Zinc acetate or $ZnSO_4$.

7. The process according to claim 1, wherein TEA (Triethyl amine) is used as catalyst for the metal solution (B) of Copper.

8. The process according to claim 1, wherein the process is carried out at temperature ranging from 20 to 40° C.

9. The process according to claim 1, wherein the polymer in step (a) is selected from polysulfone (PSF) and polyacrylonitrile (PAN).

10. The process according to claim 1, wherein the MOF-polymer composite is selected from CuBTC-PSF; ZIF-8-PSF (Zinc Imidazolate framework); CuBTC-PAN and ZIF-8-PAN.

11. The process according to claim 1, wherein the thickness of the MOF layer on the polymer membrane ranges from 10 μm-25 μm.

12. The process according to claim 1, wherein CuBTC crystals have size ranging from 5 to 20 μm on the membrane and 200 to 500 nm inside the pores.

13. The process according to claim 1, wherein the ZIF-8 crystals have size ranging from 5 μm to 200 nm on the membrane and 20-80 nm inside the pores.

14. Metallic Organic Frameworks (MOF)-polymer composite substantially devoid of pores without pre-seeding or substrate modification as-prepared by a process comprising the steps of:
   a) subjecting a porous polymer membrane to solvent treatment for period in the range of 4 to 8 hr;
   b) repeatedly treating the membrane of step (a) with ligand solution A for period in the range of 8 to 12 hrs followed by treatment with metal solution B for period in the range of 8 to 12 hrs or vice versa; and
   c) repeatedly treating the membrane of step (b) with ligand solution (A) for period in the range of 8 to 12 hrs, followed by suspending the membrane in mixture of solution A and B for period in the range of 8 to 12 hrs to obtain MOF polymer composite;
   wherein the thickness of the MOF layer on the polymer membrane ranges from 10 μm-25 μm.

* * * * *